US006774975B2

(12) United States Patent
Ahn

(10) Patent No.: US 6,774,975 B2
(45) Date of Patent: Aug. 10, 2004

(54) LIQUID CRYSTAL DISPLAY PANEL HAVING A PATTERNED SPACER

(75) Inventor: Byung Chul Ahn, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 12 days.

(21) Appl. No.: 09/792,050

(22) Filed: Feb. 26, 2001

(65) Prior Publication Data

US 2001/0040665 A1 Nov. 15, 2001

(30) Foreign Application Priority Data

Feb. 25, 2000 (KR) .......................................... 2000-9502

(51) Int. Cl.[7] ..................... G02F 1/1339; G02F 1/1337; G02F 1/1333

(52) U.S. Cl. ....................... 349/156; 349/155; 349/123; 349/138; 349/110

(58) Field of Search ........................... 349/43, 110, 111, 349/123, 155, 156, 138

(56) References Cited

U.S. PATENT DOCUMENTS 3,978,580 A * 9/1976 Leupp et al. ................. 216/23
4,904,056 A * 2/1990 Castleberry ................. 349/110
5,003,356 A 3/1991 Wakai et al. .................. 357/4
6,016,181 A * 1/2000 Shimada ..................... 349/110
6,266,122 B1 * 7/2001 Kishimoto et al. ......... 349/156
6,429,921 B1 * 8/2002 Chen et al. ................. 349/155
6,433,852 B1 * 8/2002 Sonoda et al. .............. 349/156
6,573,969 B1 * 6/2003 Watanabe et al. ........... 349/155

FOREIGN PATENT DOCUMENTS

JP 4-68318 3/1992
JP 8-234212 9/1996
JP 9-22028 1/1997

* cited by examiner

*Primary Examiner*—Tarifur R. Chowdhury
(74) *Attorney, Agent, or Firm*—Morgan Lewis & Bockius LLP

(57) ABSTRACT

A liquid crystal display panel provided with a lower substrate and an upper substrate spaced from and facing to each other to have a gap therebetween. In the liquid crystal panel, a liquid crystal layer is positioned between the first and second substrate. The lower substrate has a thin film transistor formed thereon and a patterned spacer formed on the thin film transistor and supporting the second substrate. The thin film transistor has a semiconductor pattern, a source electrode and drain electrode. A portion of the semiconductor pattern is exposed between the source electrode and the drain electrode. The patterned spacer has an insulating layer on the bottom which is in contact with the exposed portion of the semiconductor pattern.

7 Claims, 13 Drawing Sheets

71 77 75 80 79 81 68 66 50 57 51 55 59 63 53 61 65 69 67

LIQUID CRYSTAL DISPLAY PANEL HAVING A PATTERNED SPACER

BACKGROUND OF THE INVENTION

1. Field of the Invention

This invention relates to a liquid crystal display panel, and more particularly to a liquid crystal display panel wherein a lower substrate provided with a thin film transistor array has a constant distance from an upper substrate provided with color filters.

2. Description of the Related Art

Generally, a liquid crystal display (LCD) panel consists of a lower transparent substrate, an upper transparent substrate and a liquid crystal injected into a space defined by an adhesion of the upper transparent substrate to the lower transparent substrate.

In the lower transparent substrate, a pixel array in which a plurality of thin film transistors each consists of a gate electrode, a gate insulating film, an active layer, an ohmic contact layer, source and drain electrodes is electrically connected to a pixel electrode to make each pixel. Also, a driving circuit is formed or installed on the lower transparent substrate. In the upper transparent substrate, color filters and black matrices used as light-shielding layers are formed.

In a fabricating process of the LCD panel, the lower substrate and the upper substrate are manufactured by a separate process. Then, the lower substrate and the upper substrate are adhered to each other by a sealant such that the pixel electrodes of the lower substrate are opposed to the color filters of the upper substrate at a desired distance to define a space. A liquid crystal is injected into this space.

FIG. 1 is a planar view showing a lower substrate of a conventional liquid crystal panel, and FIG. 2 is a sectional view showing a structure of a conventional LCD panel, which includes the lower substrate of FIG. 1, across line A–A' of FIG. 1.

Referring to FIGS. 1 and 2, the conventional LCD panel consists of a lower substrate 10, an upper substrate 40 and a liquid crystal 45 filled in a space between the lower substrate 10 and the upper substrate 40.

The lower substrate 10 includes: a gate line 15; a data line 26; a thin film transistor positioned at a intersection of the gate line 15 with the data line 26; a pixel electrode 31 formed in a pixel area defined by crossing the gate and data lines 15 and 26; a spacer 43 on the intersection of the gate line 15 with the data line 26 for maintaining a constant distance between the upper and lower substrates The thin film transistor consisting of a gate electrode 13, a gate insulating film 17, an active layer 19, an ohmic contact layer 21 and source and drain electrodes 23 and 25 formed on a first transparent substrate 11. The gate electrode 13 is connected to a date line 15, and the source electrode 23 is connected to a data line 26.

A protective layer 27 covering the thin film transistors having the above-mentioned structure are formed on the gate insulating film 17, and a contact hole 29 exposing the drain electrode 25 is defined at this protective layer 27. On the protective layer 27 are provided a transparent pixel electrode 31 being in contact with and electrically connected to the drain electrode via the contact hole 29. Also, a first alignment film 33 covering a pixel electrode 31 is formed on the protective layer 27.

The upper substrate 40 has a black matrix 37 and color filters (not shown) formed on a second transparent substrate 35. The black matrix 37 is formed at a portion corresponding to the thin film transistor of the lower substrate, or a portion corresponding to the gate line 15 and the data line 26 including said portion corresponding to the thin film transistor. The color filters are formed in correspondence with the pixel electrode to filter and pass red(R), green(G) and blue(B) lights. A transparent common electrode 39 are formed at the front side of the second transparent substrate 35, and a second alignment film 41 is formed on this common electrode 39.

The lower substrate 10 and the upper substrate 40 are adhered to each other such that the thin film transistor is opposed to the black matrix 37. In this case, a spacer 43 for allowing the lower substrate 10 to have a constant distance from the upper substrate is provided. The spacer 43 is made from an organic insulating material. The spacer 43 is formed at an intersection between the gate line 15 and the data line 26 of the data line 26 of the lower substrate 10 to constantly keep a distance between the lower substrate 10 and the upper substrate 40. The spacer 43 may be formed at the lower substrate 10 or the upper substrate 40. A liquid crystal 45 is injected a space made by an adhesion of the lower substrate 10 to the upper substrate 40.

As described above, the conventional LCD panel has constantly keep a space between the lower substrate and the upper substrate adhered to each other by means of the spacer formed at an intersection between the gate line and the data line of the lower substrate or the upper substrate.

However, the conventional LCD panel has a problem in that, since the lower substrate requires a spacer for constantly keeping a space between the lower substrate adhered to the protective layer protecting the thin film transistor and the upper substrate and the upper substrate requires a black matrix for shutting off a light, its structure and its fabricating process become complex. Also, the conventional LCD panel has a problem in that, since it is necessary to define a contact hole for connecting the pixel electrode to the drain electrode, its fabricating process becomes complex

SUMMARY OF THE INVENTION

Accordingly, it is an object of the present invention to provide a liquid crystal display panel wherein a space between a lower substrate and an upper substrate can be constantly kept by means of a protective film pattern.

Another object of the present invention is to provide a liquid crystal display panel wherein an upper substrate thereof does not require a block matrix for shielding a light.

In order to achieve these and other objects of the invention, a liquid crystal display panel according to one aspect of the present invention includes: a first substrate and a second substrate spaced from and facing to each other to have a gap therebetween; a liquid crystal layer between the first and second substrate; a thin film transistor formed on the first substrate, the thin film transistor having a semiconductor pattern, a source electrode and drain electrode, a portion of the semiconductor pattern being exposed between the source electrode and the drain electrode; and a patterned spacer formed on the thin film transistor and supporting the second substrate, the patterned spacer having an insulating layer on the bottom which is in contact with the exposed portion or the semiconductor pattern.

The first substrate and the second substrate include a first alignment layer ants a second alignment layer respectively. A part of the first alignment layer contacts contact the second alignment layer on a top surface of the patterned spacer. The patterned pacer includes a nontransparent layer on the organic layer. The nontransparent layer is wider than the exposed portion of the semiconductor pattern.

The liquid crystal display panel further including a data line formed on the first substrate and electrically coupled to one of the source and drain electrodes. The organic layer of the patterned spacer extends over the data line.

BRIEF DESCRIPTION OF THE DRAWINGS

These and other objects of the invention will be apparent from the following detailed description of the embodiments of the present invention with reference to the accompanying drawings, in, which.

DETAILED DESCRIPTION OF THE PREFERRED EMBODIMENT

Figure 1:
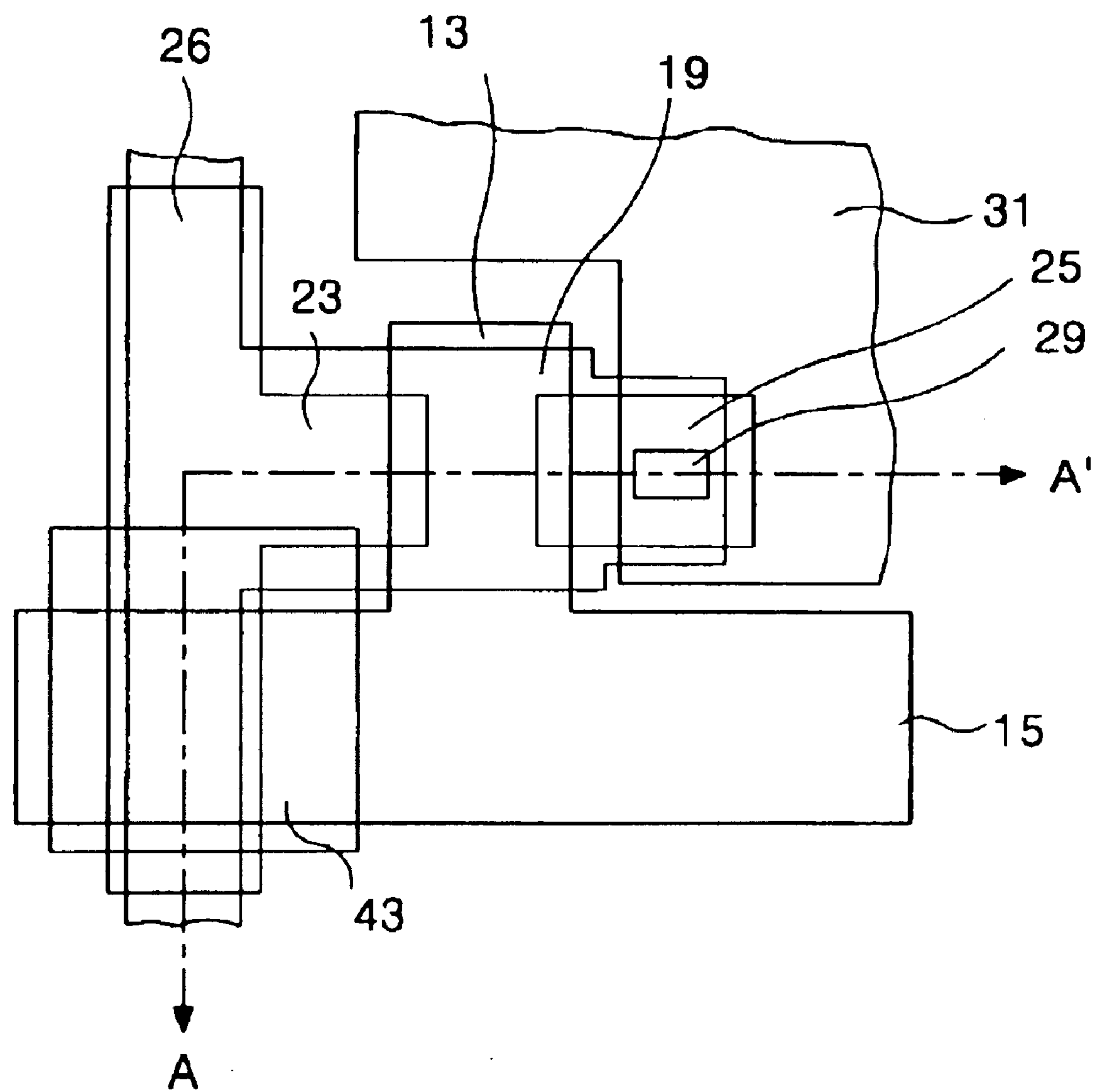
FIG. 1 is a planar view showing a lower substrate of a conventional liquid crystal display panel.
Figure 2:
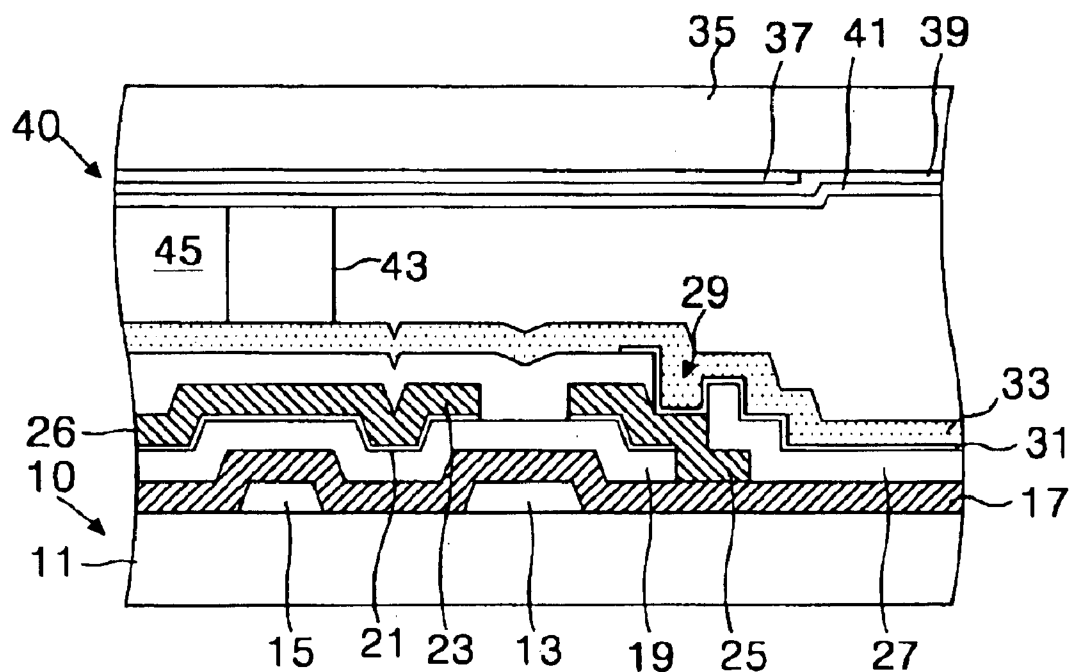
FIG. 2 is a sectional view showing a structure of a conventional liquid crystal display panel across line A–A' of FIG. 1.
Figure 3:
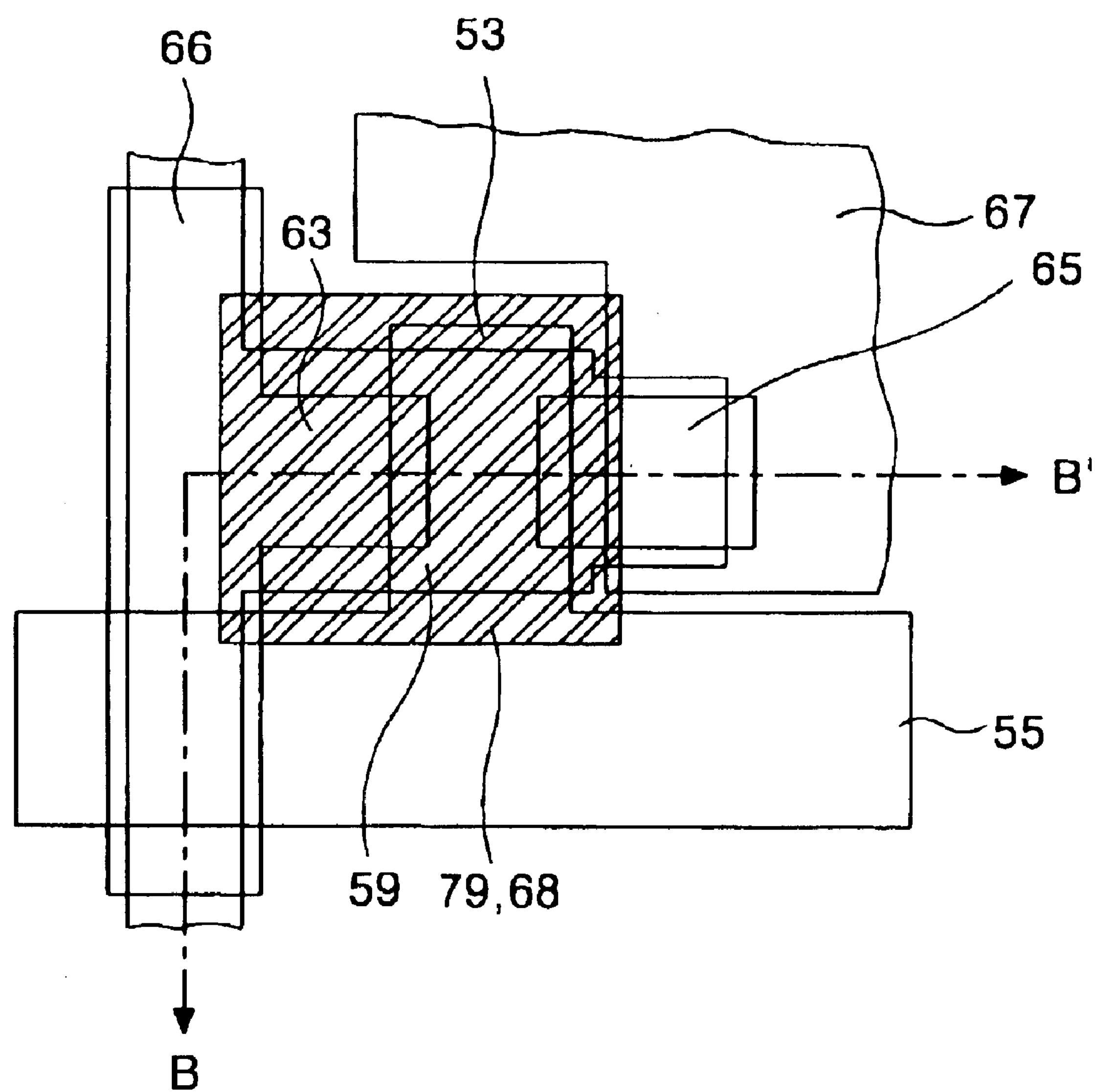
FIG. 3 is a planar view snowing a structure of a liquid crystal display panel according to a first embodiment of the present invention.
Figure 4:
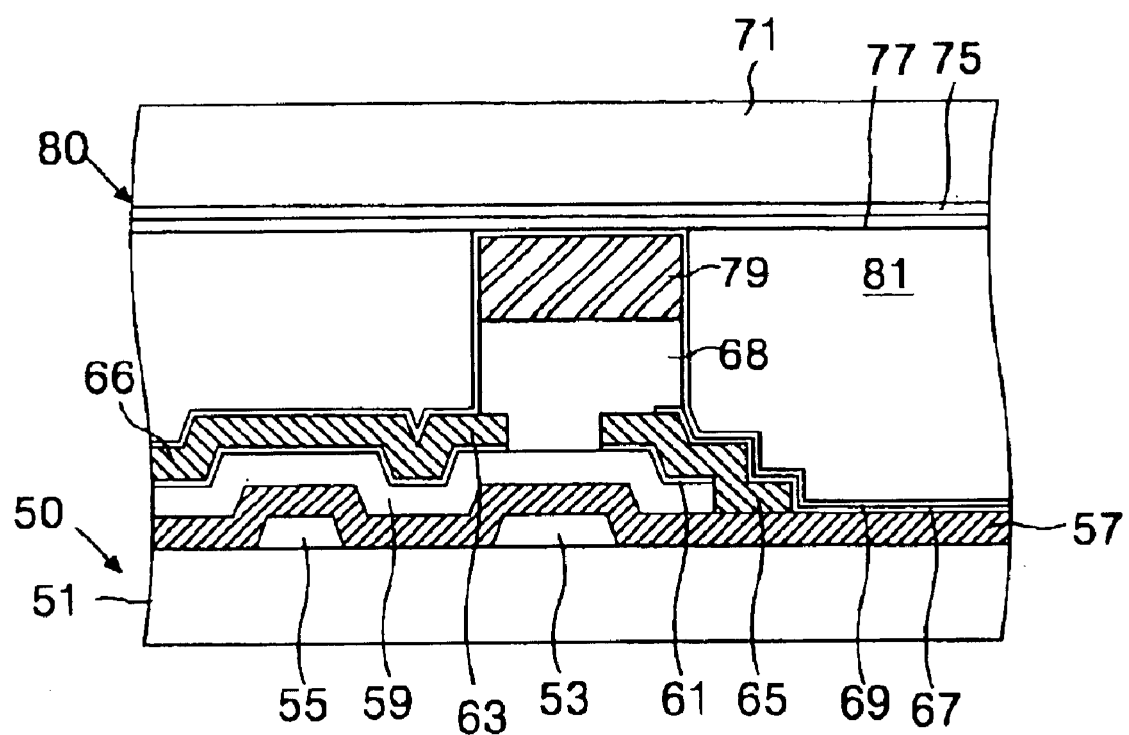
FIG. 4 is a sectional view showing a structure of a liquid crystal display panel according to a first embodiment of the present invention across line B–B' of FIG. 3.

FIG. 3 is a planar view showing a structure of a liquid crystal display panel according to a first embodiment of the present invention. FIG. 4 is a sectional view showing a structure of a liquid crystal display panel according to a first embodiment of the present invention across line B–B' of FIG. 3.

Referring to FIGS. 3 and 4, there is shown a liquid crystal display (LCD) panel according to a first embodiment of the present invention. The LCD panel consists of a lower substrate 50, an upper substrate 80 and a liquid crystal 81 filled in a space between the lower substrate 50 and the upper substrate 80. The lower substrate 50 has a patterned spacer formed thereon. The pattern spacer supports the upper substrate 80 and includes an insulating layer.

As shown in FIG. 3, the lower substrate 50 includes: a gate line 55; a data line 66; a thin film transistor positioned at a intersection of the gate line 55 with the data line 66; a pixel electrode 67 formed in a pixel area defined by crossing the gate and data lines 15 and 26; and a protective layer 68 and a light-shielding layer 79, formed on the thin film transistor, for a protection and a light-shielding of the thin film transistor. The thin film transistor consists of a gate electrode 53, a gate insulating film 57, an active layer 59, an ohmic contact layer 61 and source and drain electrodes 63 and 65 formed on a first transparent substrate 51. The gate electrode 53 is connected to a gate line 55, and the source electrode 63 is connected to a data line 66. The gate line 55 and the data line 66 cross each other, thereby defining a pixel area. The source electrode 63 and the drain electrode 65 on the ohmic contact layer 61 allow a portion of the active layer 59 to be exposed therebetween.

A transparent pixel electrode 67 being in contact with and electrically connected to the drain electrode 65 is formed at the pixel area on the gate insulating film 57. A protective film 68 and a light-shielding layer 79 patterned to cover the thin film transistor are formed on the active layer 59 in such a manner to overlap with portions of the source and drain electrodes 63 and 65. The protective film 68 is formed from a high-resistance organic insulating material such as acrylic organic compound, polyimide, cytop, BCB (benzocyclobutene) or PFCB (perfluorocyclobutane), etc., or an inorganic insulating material such as silicon nitride or silicon oxide, etc. to have a thickness of about 2 to 3 μm. The light-shielding layer 79 is formed from a high polymer material such as black carbon absorbing a light or polyacryl including a photosensitive component to have a thickness of about 2 to 3 μm.

The protective layer 68 and the light-shielding layer 79 are not only responsible for a protection and a light-shielding of the thin film transistor, respectively, but also serves a spacer for (constantly keeping an adhesion space between the lower substrate 68 and the upper substrate 80. The protective layer 68 also prevents an off current of the thin film transistor from being increased due to a conductive carbon component contained in the light-shielding layer 79. In other words, the protective layer 68 and the light-shielding layer 79 on the thin film transistor form a patterned spacer for supporting the second substrate, the patterned spacer uses the protective layer 68 on the bottom which is in contact with the exposed portion or the semiconductor pattern, as an insulating layer.

The entire surface of the lower substrate 50 having the above-mentioned structure is provided with a first alignment film 69 covering the Pixel electrode 67, the protective layer 68 and the light-shielding layer 79. The first alignment film 69 is formed from polyimide to have a thickness of about 500 to 800 Å.

The upper substrate 80 has color filters (not shown) filtering and passing red(R), green(G) and blue(B) lights formed at a portion corresponding to a pixel area on a second transparent substrate 71. In this case, since the light-shielding layer 79 is formed on the thin film transistor of the lower substrate 50, the upper substrate 80 does not require a black matrix.

A transparent common electrode 15 is formed at the front side of the second transparent substrate 71, and a second alignment film 77 is formed on this common electrode 75. The second alignment film 77 we formed from polyimide like the first alignment film 69 to have a thickness of about 500 to 800 Å.

The lower substrate 50 and the upper substrate 80 having the above-mentioned structure are adhered to each other such that the thin film transistor is opposed to the color filters (not shown). The lower substrate 50 has a constant distance from the upper substrate 80 by means of the protective layer 68 and the light-shielding layer 79 used as a spacer. A liquid crystal 81 is injected into a space defined by an adhesion of the lower substrate 50 to the upper substrate 80.

Figure 5:
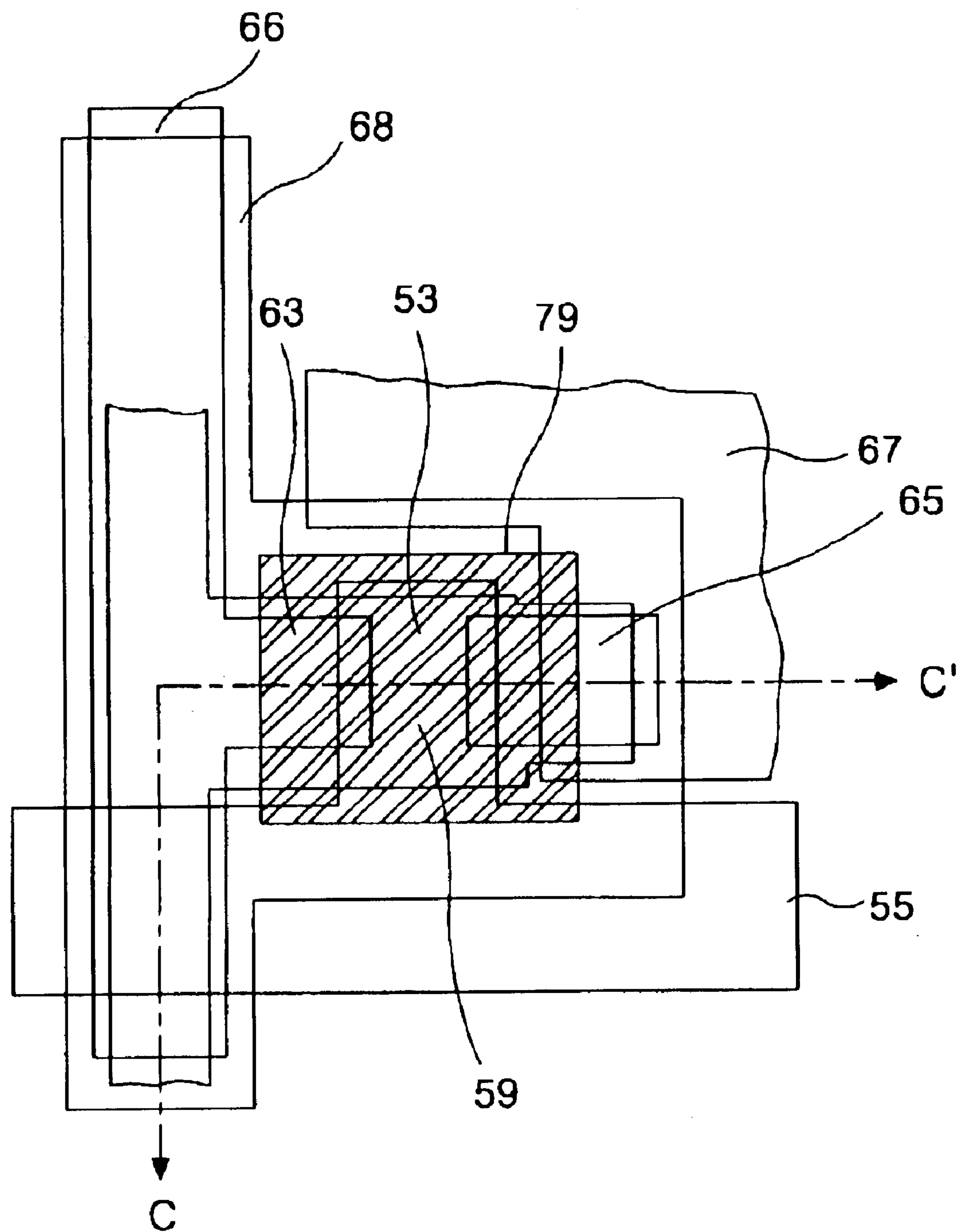
FIG. 5 is a planar view showing a structure of a liquid crystal display panel according to a second embodiment of the present invention.
Figure 6:
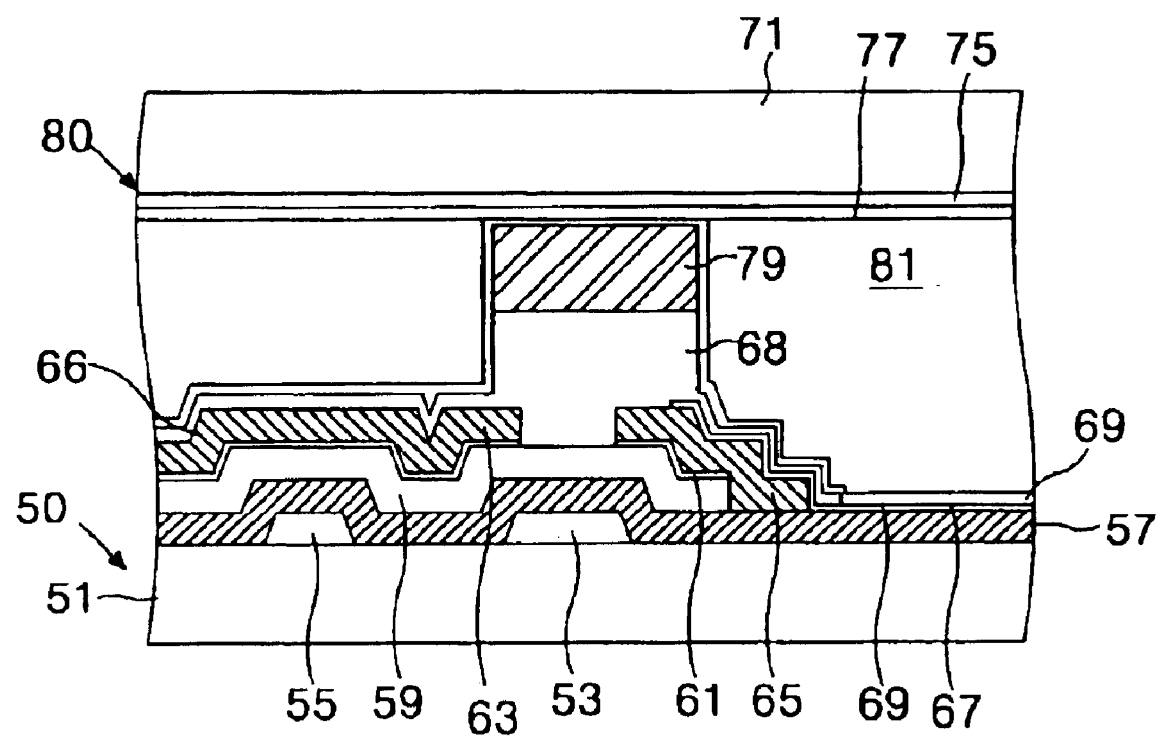
FIG. 6 is a sectional view showing a structure of a liquid crystal display panel according to a second embodiment of the present invention across line C–C' of FIG. 5.

FIG. 5 is a planar view showing a structure of a liquid crystal display panel according to a second embodiment of the present invention. FIG. 6 is a sectional view showing a structure of a liquid crystal display panel according to a second embodiment of the present invention across line C–C' of FIG. 5.

The LCD panel shown in FIGS. 5 and 6 has a structure identical to the LCD panel according to the first embodiment shown in FIGS. 3 and 4 except for a pattern of the protective layer 68. Therefore, the same reference numerals are given to the parts of FIGS. 5 and 6 identical to those of FIGS. 3 and 4.

The protective layer 68 is formed such that a portion thereof corresponding to the active layer 59 of the thin film transistor has a thickness of about 2 to 3 μm and also is left on the source and drain electrodes 63 and 65 and the data line 66 at a thickness of about 0.2 to 1 μm. Thus, the protective layer 68 not only prevents the active layer 59 of the thin film transistor from being in contact with the light-shielding layer 79 to thereby prevent an increase of off current, blot also prevents a corrosion and a current leakage of the source and drain electrodes 63 and 65 and the data line 66.

The above-mentioned LCD panels according to the first and second embodiments do not require a spacer because the protective layer 68 and the light-shielding layer are formed on the thin film transistor to constantly keep a distance between the lower substrate 50 and the upper substrate 80. Also, the upper substrates 80 of the LCD panels does not require a black matrix owing to such a light-shielding layer 70

Figure 7:
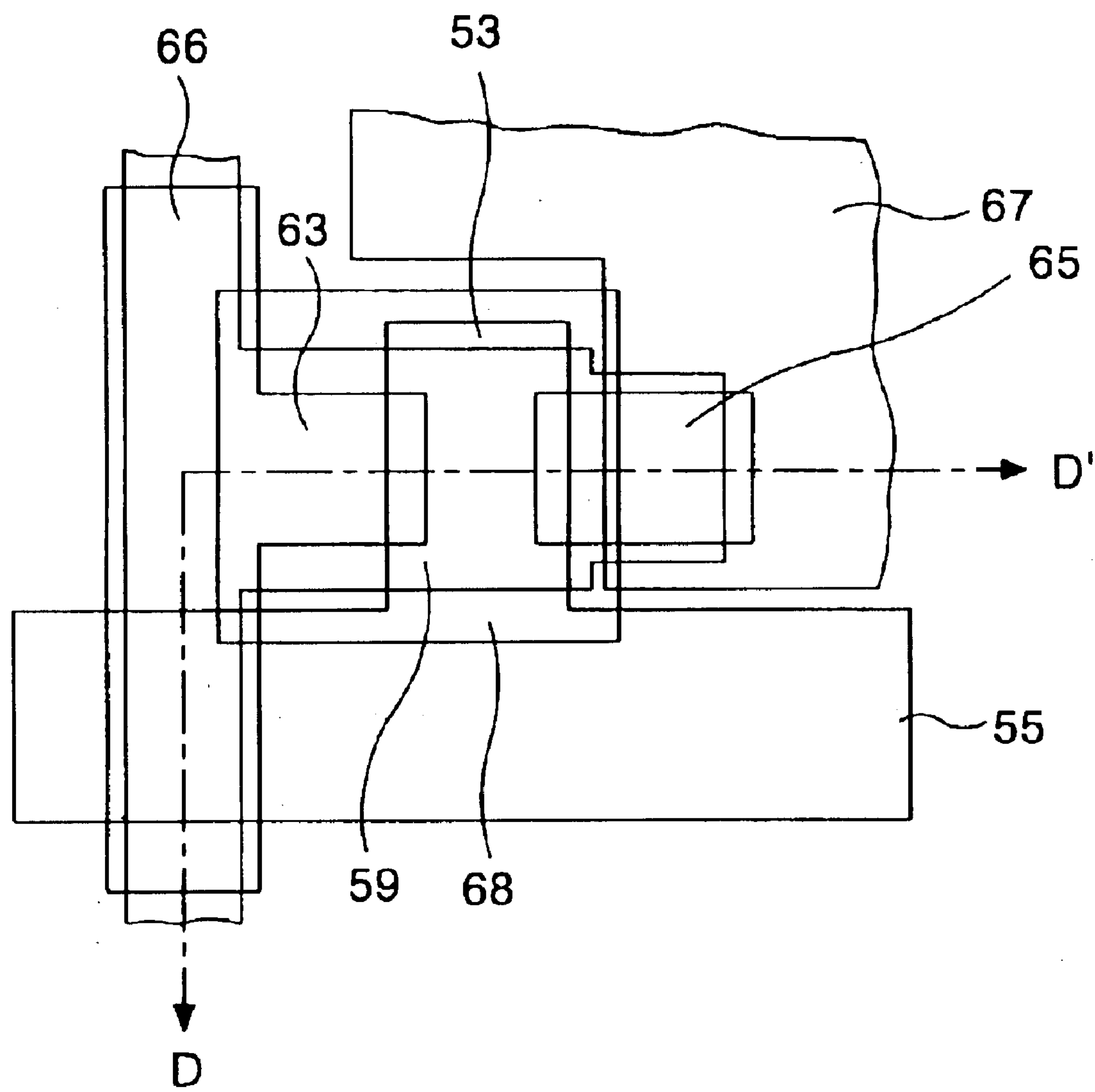
FIG. 7 is a planar view showing a structure of a liquid crystal display panel according to a third embodiment of the present invention.
Figure 8:
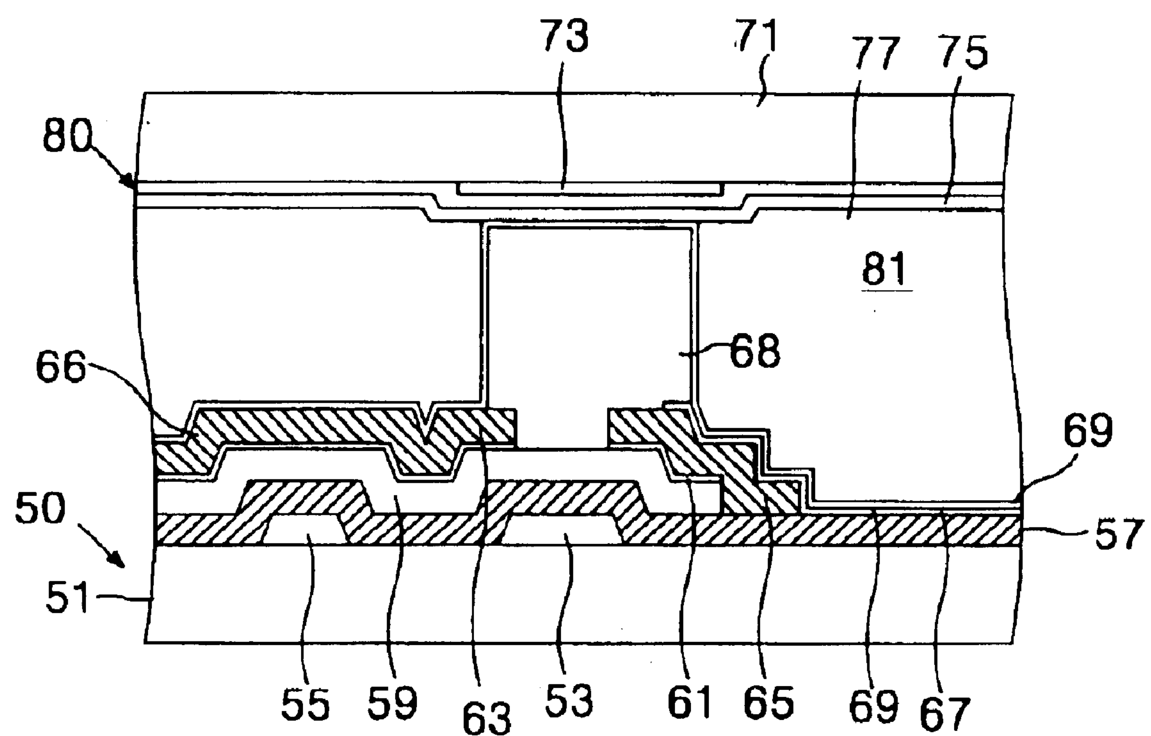
FIG. 8 is a sectional view showing a structure of a liquid crystal display panel according to a third embodiment of the present invention across line D–D' of FIG. 7.

FIG. 7 is a planar view showing a structure of a liquid crystal display panel according to a second embodiment of the present invention. FIG. 8 is a sectional view showing a structure of a liquid crystal display panel according to a second embodiment of the present invention across line D–D' of FIG. 7.

The LED panel shown in FIGS. 7 and 8 has a structure identical to the LCD panel according to the first embodiment shown in FIGS. 3 and 4 except that only a protective layer 66 constantly keeps a distance between the lower substrate 50 and the upper substrate 80 and a black matrix is formed at the upper substrate 80. Therefore, the same reference numerals are given to the parts of FIGS. 7 and 8 identical to those of FIGS. 3 and 4.

The protective layer 68 is formed on the thin film transistor to have a thickness of about 4 to 6 μm. Thus, the first alignment film 69 is formed at the entire surface of the lower substrate 50 in such a manner to cover the pixel electrode 67 and the protective layer 68.

The black matrix 73 is formed on the second transparent substrate 35 of the upper substrate 80 at a portion corresponding to the thin film transistor of the upper substrate 50, or a portion corresponding to the gate line 55 and the data line 66 including the thin film transistor.

FIG. 9A to FIG. 9D shows a process of fabricating the lower substrate of the LCD panel in FIG. 4.

Figure 9A:
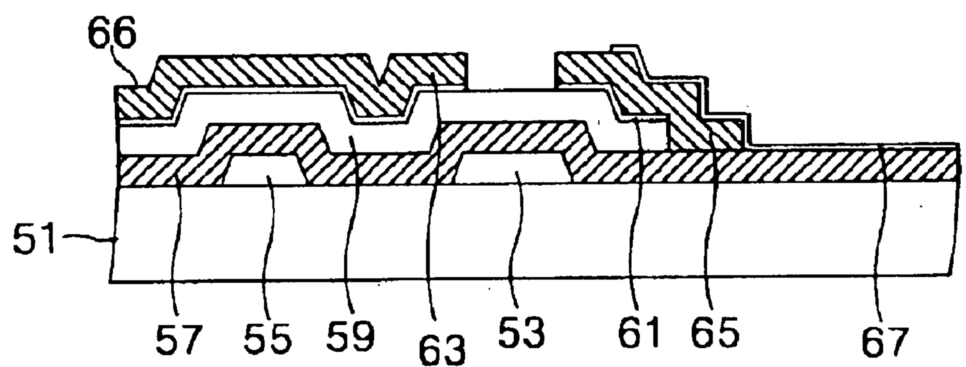
FIG. 9A to FIG. 9D are section views showing a process of fabricating the lower substrate of the liquid crystal display panel in FIG. 4.

Referring first to FIG. 9A, a plurality of thin film transistors each consisting of the gate electrode 53, the gate insulating film 57, the active layer 59, the ohmic contact layer 61 and the source and drain electrodes 63 and 65 provided on the first transparent 51 are formed in such a manner to be electrically connected to the adjacent ones via the gate line 55 and the data line 66.

Subsequently, a transparent conductive material such as indium tin oxide (ITO), tin oxide (TO) or indium zinc oxide (IZO), etc. is deposited onto the entire surface of the above-mentioned structure. At this time, the transparent conductive material is in direct contact with the source and drain electrodes 63 and 65 and the data line 66. In this case, since the transparent conductive material is directly contacted with the drain electrode 65 without a contact hole, the subject process is simplified.

Furthermore, the transparent conductive material is patterned by the photolithography including a wet etching in such a manner to be in contact with the drain electrode 65 and be left only at the pixel area, thereby forming the pixel electrode 67. At this time, the pixel electrode 67 is formed such that it is not in contact with the adjacent data line 66.

Figure 9B:
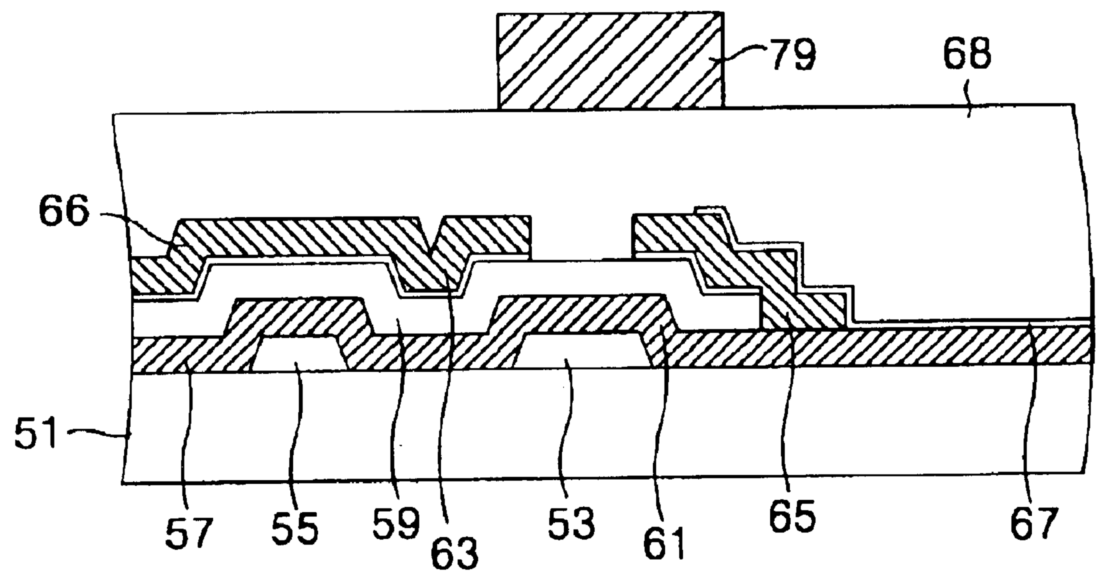

Referring to FIG. 9B, a high-resistance organic insulating material such as acrylic organic compound, polyimide, cytop, BCB or PFCB, etc. is coated on the pixel electrode 67 into a thickness of about 2 to 3 μm to cover the thin film transistor, thereby, forming the protective film 68. Alternatively, the protective layer 68 may be formed by depositing an inorganic material such as silicon nitride or silicon oxide, etc.

A high polymer material such as black carbon absorbing a light or polyacryl including a photosensitive component, etc. is coated on the protective layer 68 into a thickness of about 2 to 3 μm, thereby forming the light-shielding layer 79. A sum of the thickness of the protective layer 68 and the light-shielding layer 79 should be larger than a distance between the lower substrate and the upper substrate.

The light-shielding layer 79 is patterned by the conventional photographing method to expose the protective layer 68 and thus is left only at a portion corresponding to the thin film transistor.

Figure 9C:
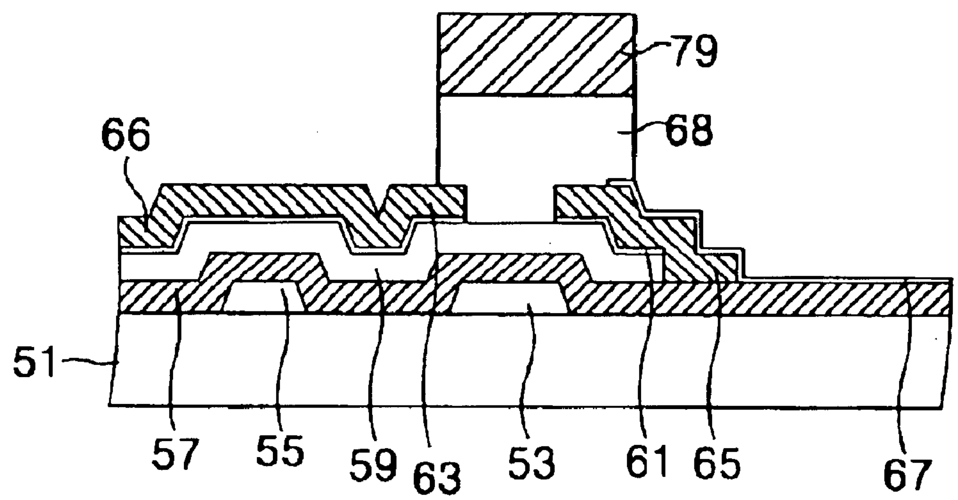

Referring to FIG. 9C, the patterned light-shielding layer 79 is used as a mask to etch the exposed portion of the protective layer 68. The protective layer 68 is selectively etched by a mixture gas of a $SF_6$ or $SF_4$ gas and an $O_2$ gas. At this time, the protective layer 68 as well as a desired thickness of the light-shielding layer 79 is removed.

In this case, the left protective film 68 and light-shielding layer 79 serges as a spacer for constantly keeping a distance between the upper substrate 80 and the lower substrate 50. Also, the light-shielding layer 79 eliminates the necessity of forming the black matrix on the upper substrate 80.

Figure 9D:
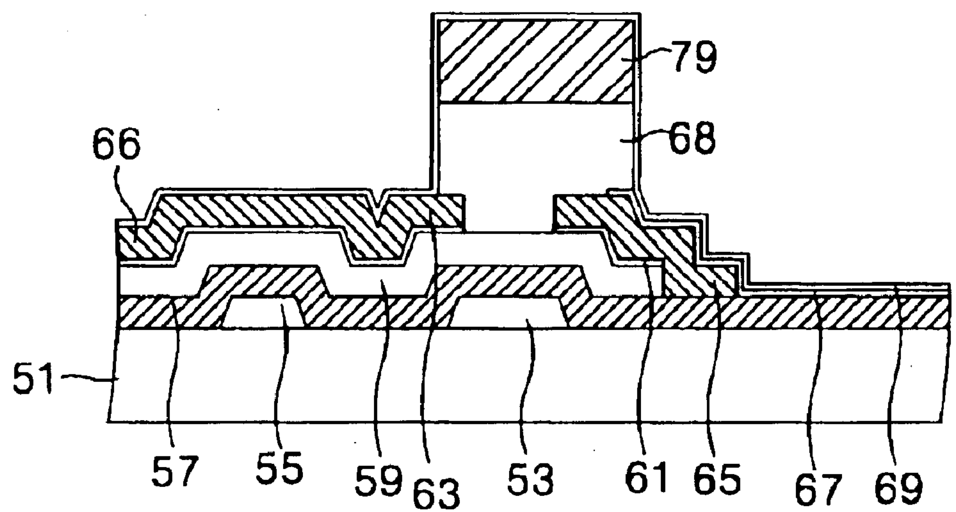

Referring to FIG. 9D, the entire surface on the above-mentioned structure is provided with the first alignment film 69 covering the pixel electrode 67, the protective layer 68 and the light-shielding layer 79. At this time, the first alignment film 69 is formed by printing polyimide into a thickness of about 500 to 800 Å by means of a screen printer.

Figure 10A:
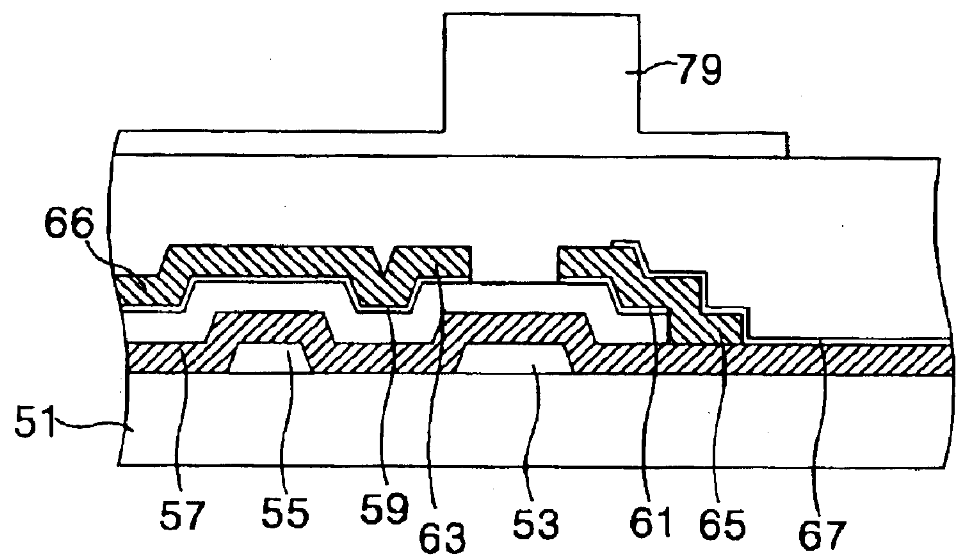
FIG. 10A to FIG. 10C are section views showing a process of fabricating the lower substrate of the liquid crystal display panel in FIG. 6.
Figure 10B:
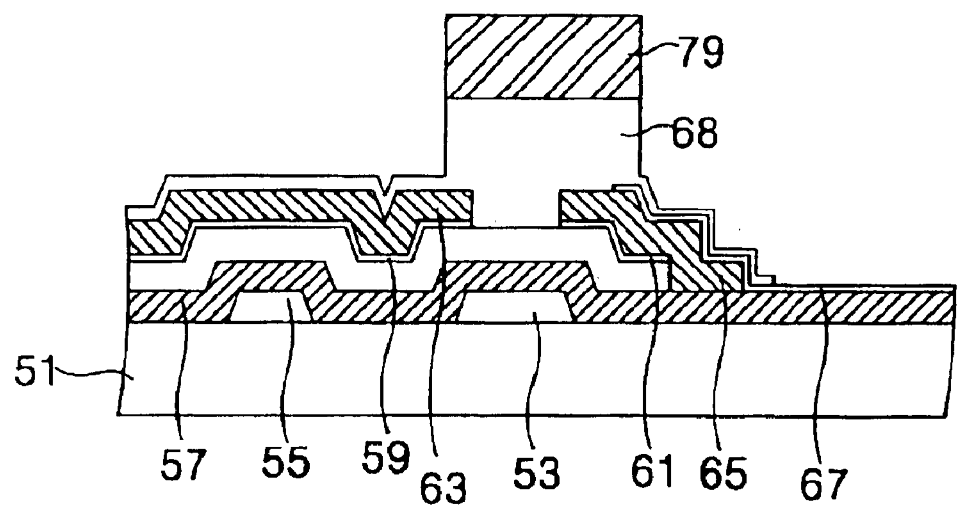
Figure 10C:
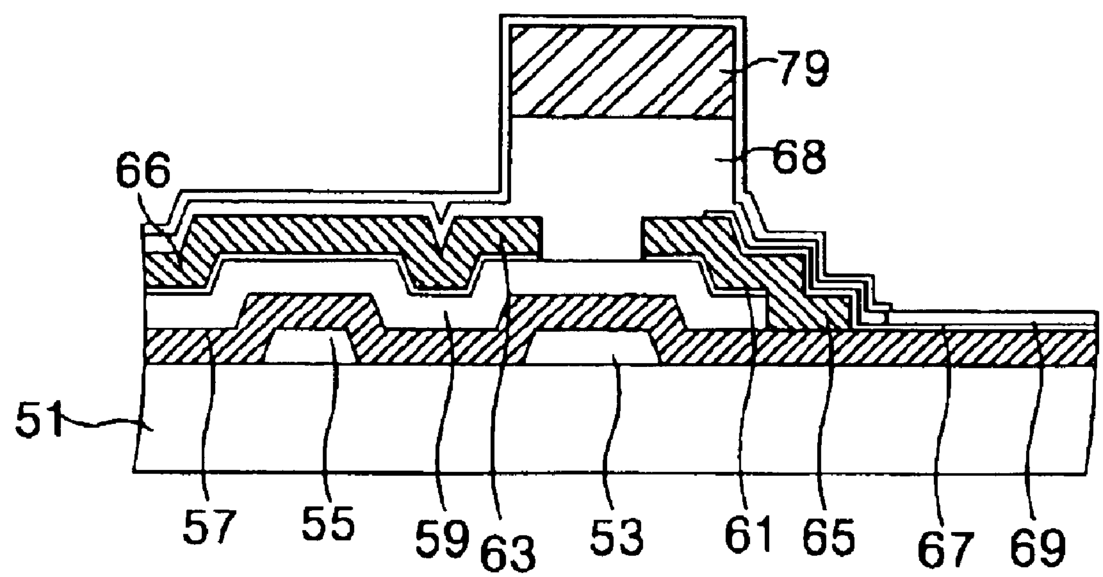

FIGS. 10A to FIG. 10C show a process of fabricating the lower substrate 50 of the LCD panel in FIG. 6.

Referring first to FIG. 10A, a plurality of thin film transistors each consisting of the gate electrode 53, the gate insulating film 57, the active layer 59, the ohmic contact layer 61 and the source and drain electrodes 63 and 65 provided on the first transparent 51 are formed in such a manner to be electrically connected to the adjacent ones via the gate line 55 and the data line 66. The pixel electrode 67 is formed in such a manner to be in contact with the drain electrode 65 and be left only at the pixel area.

A high-resistance organic insulating material such as acrylic organic compound, polyimide, cytop, BCB or PFCB, etc. is coated on the pixel electrode 67 into a thickness of about 2 to 3 μm to cover the thin film transistor, thereby forming the protective film 68. Alternatively, the protective layer 68 may be formed by depositing an inorganic material such as silicon nitride or silicon oxide, etc.

A high polymer material such as black carbon absorbing a light or polyacryl including a photosensitive component, etc. is coated on the protective layer 68 into a thickness of about 2 to 3 μm, thereby forming the light-shielding layer 79. A sum of the thickness of the protective layer 68 and the light-shielding layer 79 should be larger than a distance between the lower substrate and the upper substrate.

The light-shieldinq layer 79 is patterned by the conventional photographing method using a half-tone mask. At this time, a portion responding to the thin film transistor of the light-shielding layer 79 is not patterned and a portion corresponding to the source and drain electrodes 63 and 65 and the data line 66 of the light-shielding layer 79 is left only into a thickness of 0.2 to 1 μm. The remaining pixel area of the light-shielding layer 70 allows the protective layer to be exposed.

Referring to FIG. 10B, the patterned light-shielding layer 79 is used as a mask to selectively etch the exposed portion of the protective layer 68 by a mixture gas of a $SF_6$ or $SF_4$ gas and an $O_2$ gas by exposing the pixel electrode 67 at the pixel area. At this time, the protective layer 68 as well as a desired thickness of the light-shielding layer 79 is removed. When the protective layer 68 on the pixel area is etched, a portion left at a thin thickness on said portion of the light-shielding layer 79 corresponding to the source and drain electrodes 64 and 65 and the data line 66 also is removed.

Accordingly, a portion of the protective layer 68 corresponding to the source and drain electrodes 63 and 65 and the data line 66 also is exposed and etched. Thus, the pixel electrode 67 at the pixel area is exposed, and said portion of the protective layer 68 corresponding to the source and drain electrodes 63 and 65 and the data line 66 is left into a desired thickness, for example, a thickness of about 0.2 to 1 μm.

In this case, the protective layer 68 left at said portion corresponding to the source and drain electrodes 63 and 65 and the data line 66 prevents a corrosion and a current leakage of the source and drain electrodes 63 and 65 and the data line 66.

Referring to FIG. 10C, ten entire surface on the above-mentioned structure is provided with the first alignment film 69 covering the pixel electrode 67, the protective layer 68 and the light-shielding layer 79. At this time, the first alignment film 69 is formed by printing polyimide into a thickness of about 500 to 800 Å by means of a screen printer.

Figure 11A:
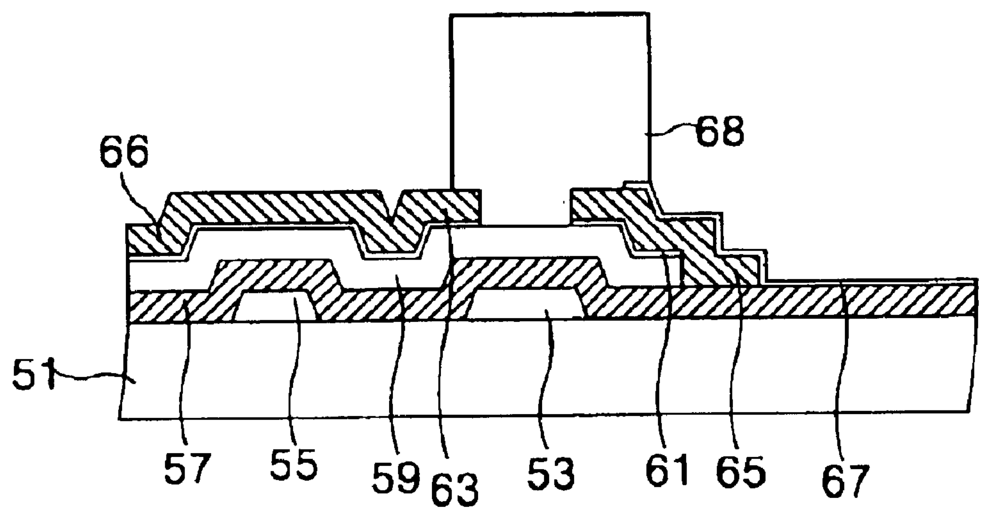
FIG. 11A and FIG. 11B are section views showing a process of fabricating the lower substrate of the liquid crystal display panel in FIG. 6.

FIG. 11A and FIG. 11C show a process of fabricating the lower substrate 50 of the LCD panel in FIG. 8.

Referring to FIG. 11A, plurality of thin film transistors each consisting of the gate electrode 53, the gate insulating film 57, the active layer 59, the ohmic contact layer 61 and the source and drain electrodes 63 and 65 provided on the first transparent 51 are formed in such a manner to be electrically connected to the adjacent ones via the gate line at 55 and the data line 66. The pixel electrode 61 is formed in such a manner to be in contact with the drain electrode 65 and be left only at the pixel area.

A high-resistance organic insulating material such as acrylic organic compound, polyimide, cytop, BCB or PFCB, etc. is coated on the pixel electrode 67 into a thickness of about 4 to 6 μm to cover the thin film transistor, thereby forming the protective film 68. Alternatively, the protective layer 68 may be formed by depositing an inorganic material such is silicon nitride or silicon oxide, etc.

The protective layer 68 is patterned by the photolithography including a wet etching using a mixture gas of a $SF_6$ or $SF_4$ gas and an $O_2$ gas in such a manner to be left only at a portion corresponding to the thin film transistor.

Figure 11B:
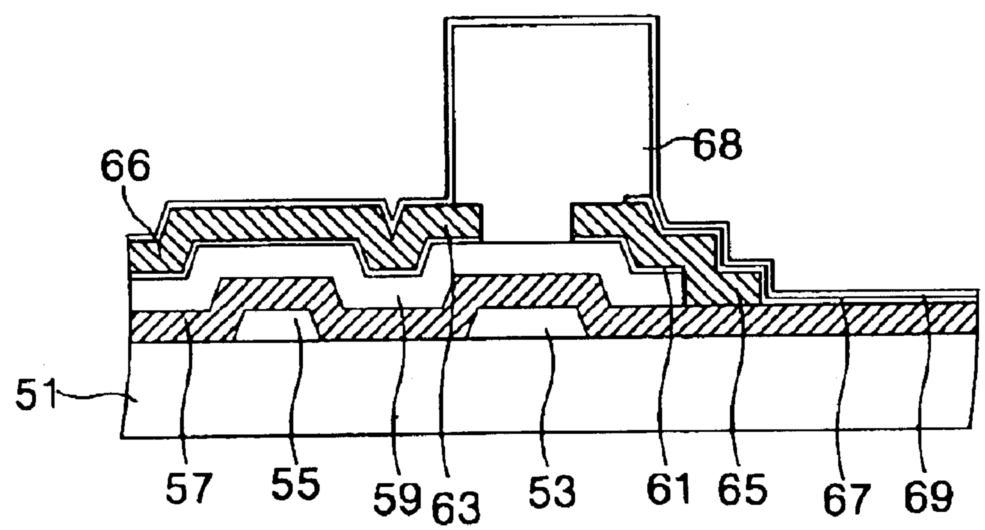

Referring to FIG. 11B, the entire surface on the above-mentioned structure is provided with the first alignment film 69 covering the pixel electrode 67 and the protective layer 68. At this time, the first alignment film 69 is formed by printing polyimide into a thickness of about 500 to 800 Å by means of a screen printer.

Since the lower substrate 50 formed by the above-mentioned process shown in FIG. 11A and FIG. 11B does not have a light-shielding layer, the black matrix 73 should be provided at the upper substrate 80 as shown in FIG. 8.

As described above, in the, LCD panel according to the present invention, the protective layer or two layers of the protective layer and the light-shielding layer formed at a portion corresponding to at least the thin film transistor are formed on the lower substrate at a higher position corresponding to a spaced distance from the upper substrate. Also, since the pixel electrode is formed prior to formation of the protective layer, it is in direct contact with the drain electrode without using a contact hole.

Accordingly, a spaced distance between the lower substrate and the upper substrate can be constantly kept by the protective layer or two layers of the protective layer and the light-shielding layer without an additional spacer, and the upper substrate does not require a black matrix for shutting off a light owing to the light-shielding layer provided on the lower substrate. Also, the pixel electrode is in direct contacted with the drain electrode without a contact hole. As a result, the LCD panel fabricating process can be reduced.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What in claimed is:

1. A liquid crystal display comprising:

a first substrate and a second substrate spaced from and facing to each other to have a gap therebetween;

a liquid crystal layer between the first and second substrates;

a thin film transistor formed on the first substrate, the thin film transistor having a semiconductor pattern, a source electrode and a drain electrode, a portion of the semiconductor pattern being exposed between the source electrode and the drain electrode;

a pixel electrode directly contacting the drain electrode;

a patterned spacer formed on the thin film transistor and supporting the second substrate, wherein the patterned spacer includes an insulating layer being in contact with the exposed portion of the semiconductor pattern, a portion of source and drain electrodes, and a portion of the pixel electrode;

a first alignment layer entirely covering the first substrate and the patterned spacer; and a second alignment layer formed on the second substrate, wherein a part of the first alignment layer contacts the second alignment layer at a top surface of the patterned spacer.

2. The liquid crystal display as claimed in claim 1, wherein the patterned spacer further includes a nontransparent layer on the insulating layer, the nontransparent layer being wider than the exposed portion of the semiconductor pattern.

3. The liquid crystal display as claimed in claim 1, further comprising a data line formed on the first substrate and directly coupled to one of the source and drain electrodes, wherein the insulating layer of the patterned spacer covers the data line.

4. The liquid crystal display as claimed in claim 1, wherein the insulating layer includes an organic insulating material.

5. The liquid crystal display as claimed in claim 1, wherein the insulating layer is extended to the source and drain electrodes to protect them.

6. A liquid crystal display comprising:

a first substrate and a second substrate spaced from and facing to each other to have a gap therebetween;

a liquid crystal layer between the first and second substrates;

a thin film transistor formed on the first substrate, the thin film transistor having a semiconductor pattern, a source electrode and a drain electrode, a portion of the semiconductor pattern being exposed between the source electrode and the drain electrode; and a patterned spacer formed on the thin film transistor and supporting the second substrate, wherein the patterned spacer includes an insulating layer being extended to cover and protect the exposed portion of the semiconductor pattern and the source and drain electrodes, and a nontransparent layer formed on the insulating layer, the nontransparent layer being wider than the exposed portion of the semiconductor pattern.

7. The liquid crystal display as claimed in claim 6, further comprising a pixel electrode formed directly on the drain electrode, wherein the insulating layer is extended to cover and protect the pixel electrode.

* * * * *